United States Patent [19]

Bryant

[11] 4,290,472

[45] Sep. 22, 1981

[54] TIRE BUILDING APPARATUS

[75] Inventor: Emerson C. Bryant, Edwardsburg, Mich.

[73] Assignee: National-Standard Company, Niles, Mich.

[21] Appl. No.: 87,876

[22] Filed: Oct. 24, 1979

Related U.S. Application Data

[63] Continuation-in-part of Ser. No. 944,578, Sep. 21, 1978, abandoned.

[51] Int. Cl.$^3$ .............................................. B29H 17/16
[52] U.S. Cl. .................................... 156/416; 156/132; 156/401
[58] Field of Search .................... 156/123 R, 131, 132, 156/133, 394, 400, 401, 414-420

[56] References Cited

U.S. PATENT DOCUMENTS

| | | | |
|---|---|---|---|
| 3,035,629 | 5/1962 | Vanzo et al. | 156/403 |
| 3,053,308 | 9/1962 | Vanzo et al. | 156/416 |
| 3,265,549 | 8/1966 | Woodhall et al. | 156/131 |
| 3,833,445 | 9/1974 | Mallory | 156/401 |
| 3,853,653 | 12/1974 | Olbert et al. | 156/128 R |
| 4,007,081 | 2/1977 | Mallory | 156/417 |
| 4,010,058 | 3/1977 | Kubinski et al. | 156/415 |
| 4,011,127 | 3/1977 | Eichholz | 156/416 |
| 4,060,445 | 11/1977 | Houck et al. | 156/414 |
| 4,128,450 | 12/1978 | Cantarutti | 156/417 |

Primary Examiner—John E. Kittle

Attorney, Agent, or Firm—Emrich, Root, Lee, Brown & Hill

[57] ABSTRACT

A tire building apparatus having two end drums disposed on respective opposite sides of an intermediate drum, with the intermediate drum embodying an expandable sleeve for pneumatically expanding and supporting the portion of a tire carcass to be disposed between the beads of a completed tire, and with the end drums carrying bead lock clamping members and ply turn-up bags that are movable inwardly toward the longitudinal center of the apparatus during the aforementioned expanding of the tire carcass, the bags being of dual-compartment construction, having inner compartments for effecting ply turn-up operations at air pressures greater than the air pressure for expanding and supporting the sleeve, and outer compartments for effecting additional sidewall-applying operations at internal air pressure less than the pressures in the inner compartments, and with the components of the intermediate drum and end drums being readily removable and replaceable for changing the size of the tire to be produced by the apparatus.

In a modified form of the invention, which is particularly well adapted for completing the building of a tire from a preformed carcass that embodies two beads and the sidewall components of the tire, the apparatus embodies the construction of the preferred form of the apparatus except that it embodies stops for the carcass material and a substantially cylindrical supporting member for the expandable sleeve, and it does not embody the ply turn-up bags thereof.

16 Claims, 17 Drawing Figures

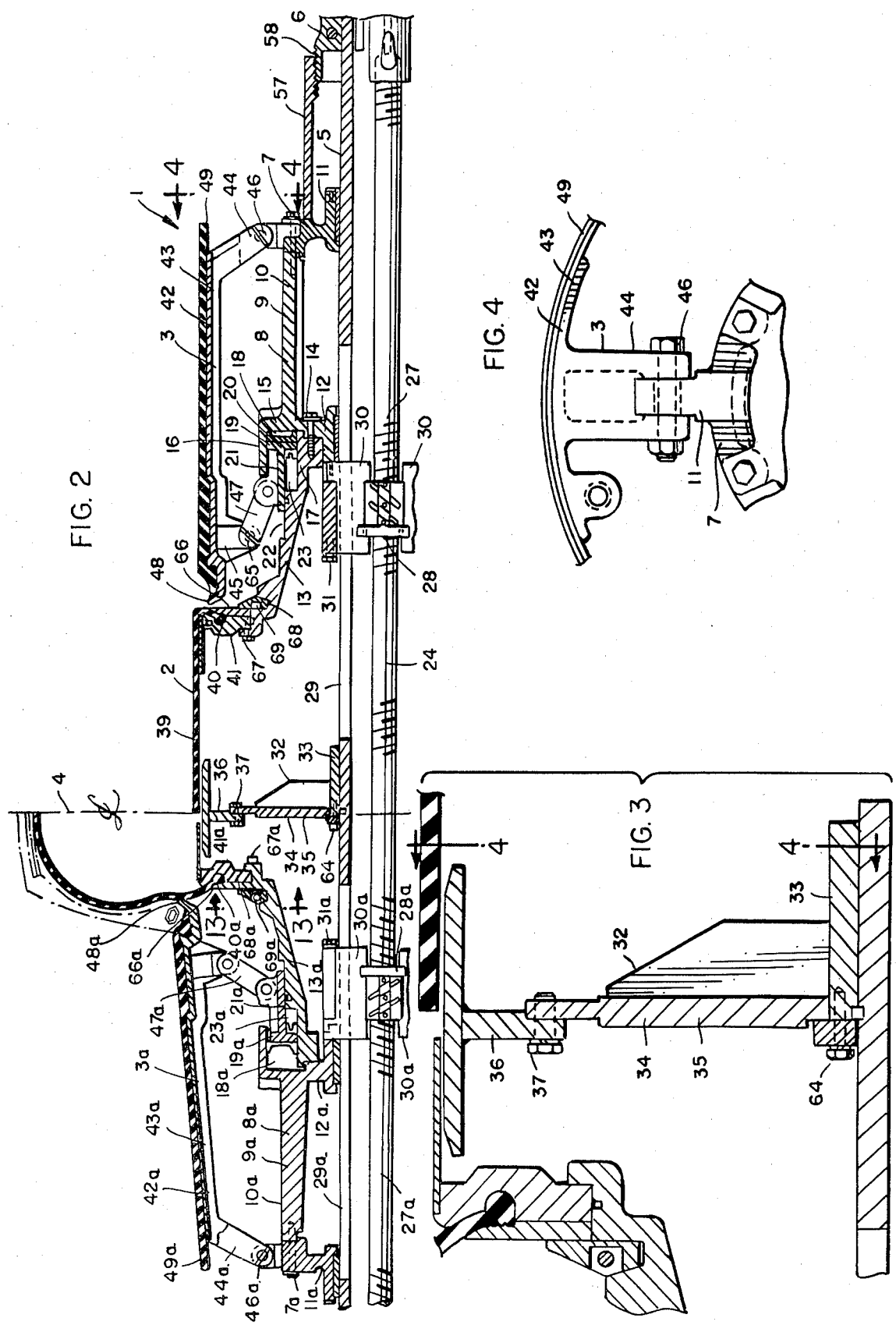

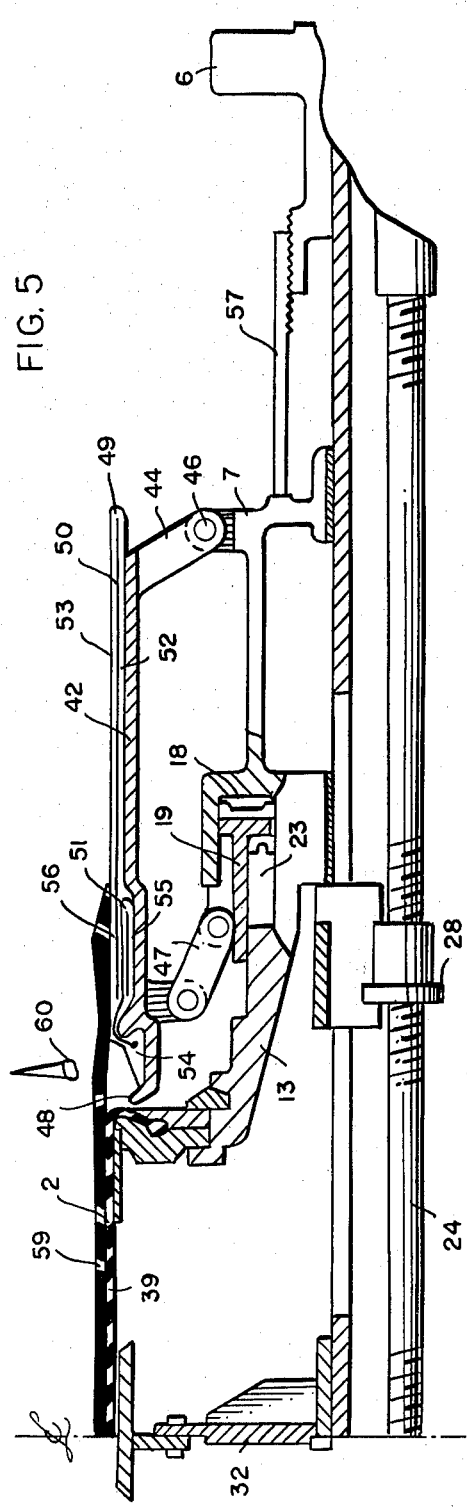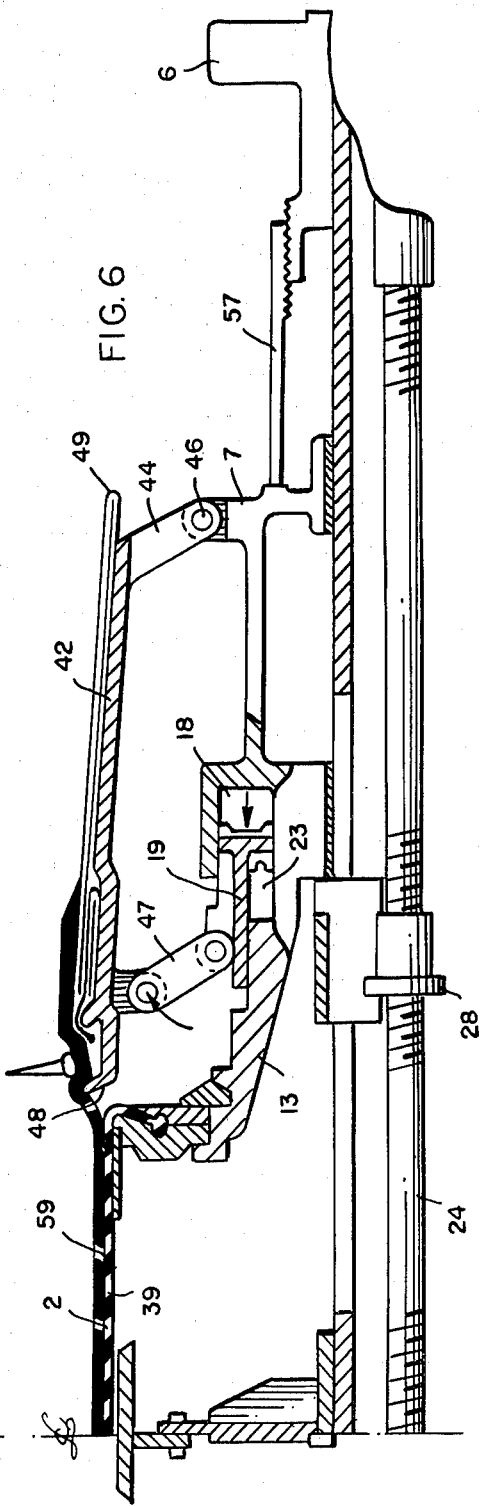

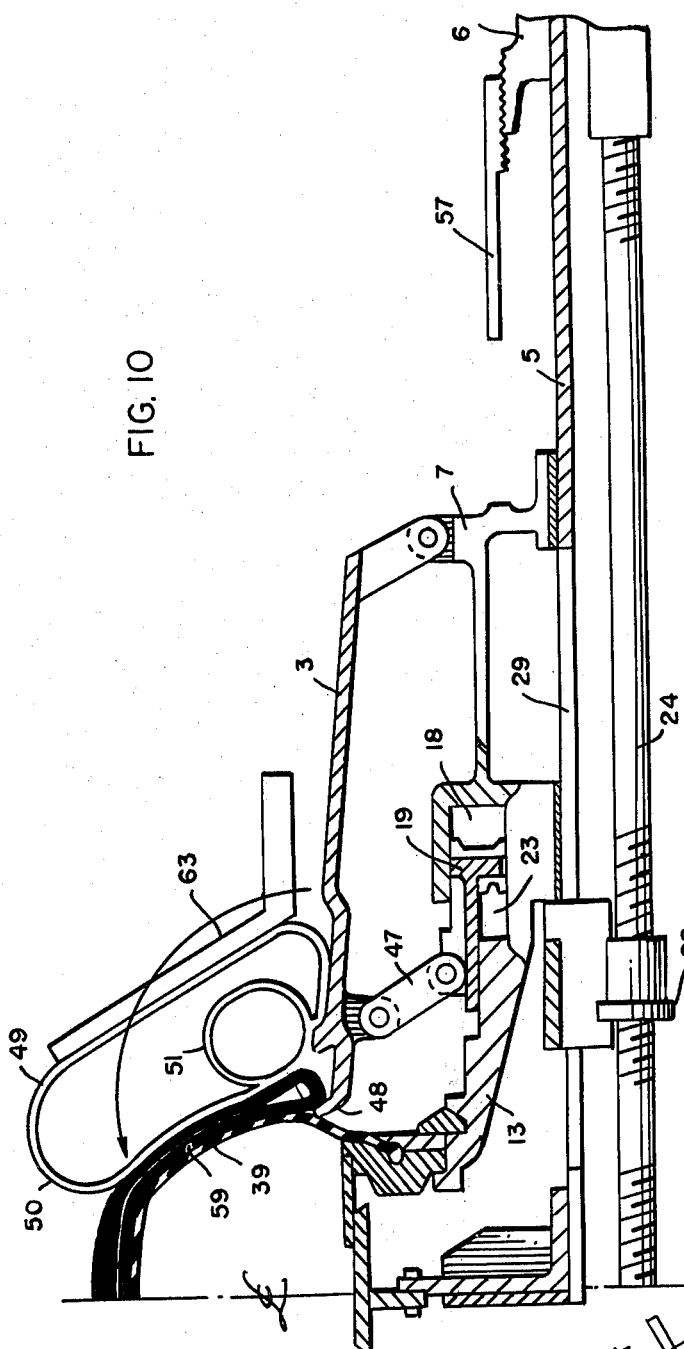
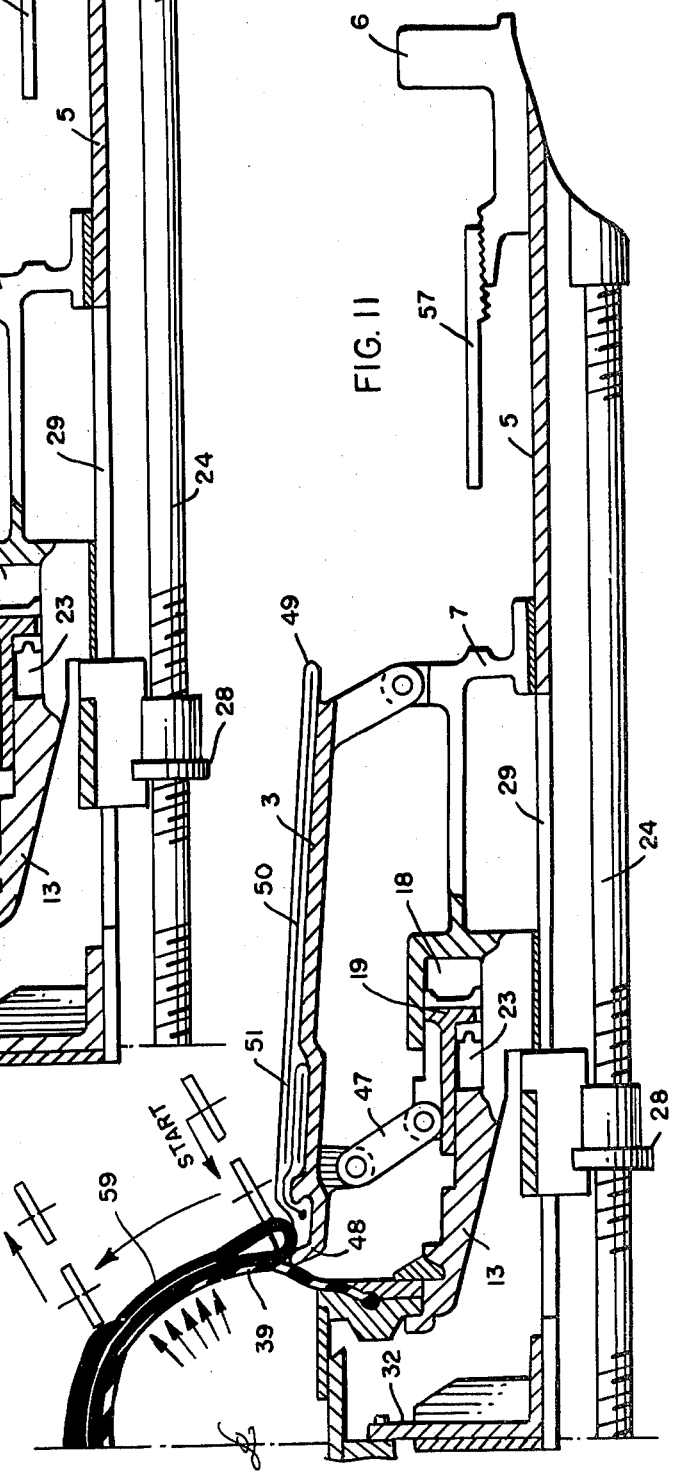

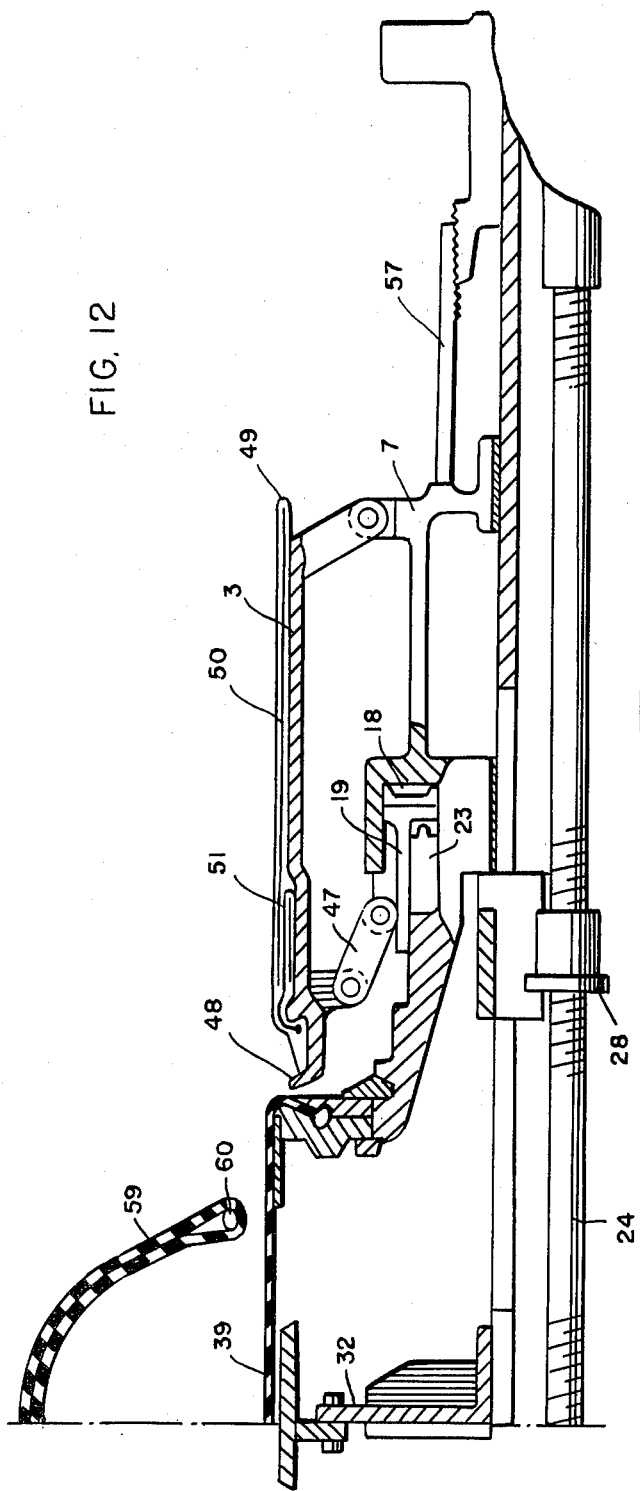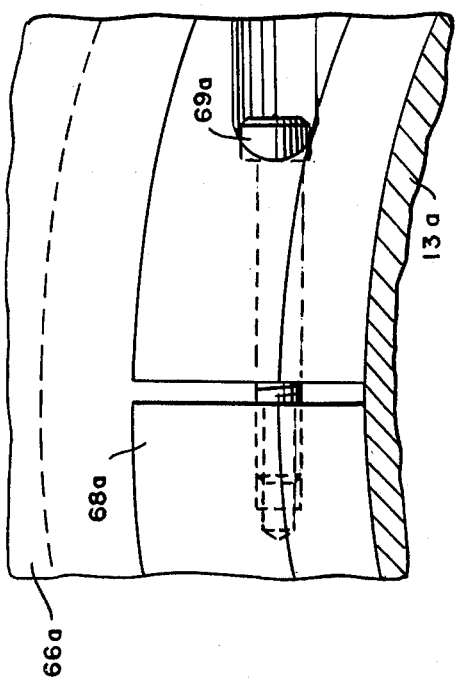

TIRE BUILDING APPARATUS

BACKGROUND OF THE INVENTION

This is a continuation-in-part of my co-pending application for U.S. Pat., Ser. No. 944,578, filed Sept. 21, 1978, and entitled "TIRE BUILDING APPARATUS", now abandoned.

This invention relates to tire building apparatus, and, more particularly, to tire building apparatus wherein the carcass material is expanded pneumatically, without use of any solid expansion members.

It is a primary object of the present invention to afford a novel tire building apparatus.

A further object of the present invention is to afford a novel tire building apparatus wherein the carcass material, between the beads, is expanded pneumatically, without the use of solid expansion members.

A further object of the present invention is to afford a novel tire building apparatus wherein the ply turn-up operations and the application of the sidewall components are effected pneumatically.

Tire building apparatus, wherein the portion of the carcass material disposed between the beads is expanded pneumatically, has been heretofore known in the art, being shown, for example, in U.S. Pat. Nos. 3,035,629, issued May 22, 1962 to M. Vanzo et al; and 3,053,308, issued Sept. 11, 1962 to M. Vanzo et al. It is an important object of the present invention to afford improvements over such tire building apparatus heretofore known in the art.

Also, tire building apparatus wherein the ply turn-up operations and the application of sidewall components have been effected pneumatically have been heretofore known in the art, being shown, for example, in the aforementioned Vanzo et al U.S. Pat. No. 3,053,308, and in U.S. Pat. No. 3,833,445, issued Sept. 3, 1974 to Edwin E. Mallory and myself. It is another important object of the present invention to afford improvements over such tire building apparatus heretofore known in the art.

Another object of the present invention is to afford a novel tire building apparatus wherein, during the operation thereof, the carcass-forming operations and the subsequent ply turn-up and sidewall-applying operations are performed in a novel and expeditious manner.

An object ancillary to the foregoing is to afford a novel tire forming apparatus of the aforementioned type wherein the aforementioned operations are performed pneumatically.

A further object of the present invention is to afford a novel tire building apparatus of the aforementioned type wherein the ply turn-up operations are performed by members which are inflated with air pressures higher than the air pressure supporting the portion of the carcass material which is disposed between the beads of the tire.

Another object of the present invention is to afford a novel tire building apparatus of the aforementioned type, wherein the ply turn-up and sidewall-applying operations are performed by inflatable dual-compartment bags, with the initial operation performed by compartments disposed closely adjacent to the tire beads and at an air pressure that is greater than the air pressure supporting the carcass material disposed between the beads, and with the remainder of the sidewall-applying operation being performed by compartments that are disposed outwardly of the first mentioned compartments, and wherein the outer compartments are inflated by air pressures that are less than the air pressures inflating the first mentioned compartments.

Yet another object of the present invention is to afford a novel tire building apparatus wherein the components of the apparatus may be quickly and easily changed to adapt the apparatus for the building of various size tires, without extensive over-haul of the apparatus and without prolonged shut-down time thereof.

Another object of the present invention is to afford a novel tire building apparatus of the aforementiond type which embodies a novel intermediate drum and two novel end drums, disposed on respective opposite sides of the intermediate drum, consituted and arranged in a novel and expeditious manner.

A further object of the present invention is to afford a novel tire building apparatus which may be used to build a complete tire in a single stage.

Another object of the present invention is to afford a novel tire building apparatus which may be used to complete the building of a tire that has been pre-constructed on another suitable apparatus.

Another object of the present invention is to afford a novel tire building apparatus of the aforementioned type which is practical and efficient in operation, and which may be readily and economically produced commerically.

Other and further objects of the present invention will be apparent from the following description and claims and are illustrated in the accompanying drawings which, by way of illustration, show the preferred embodiments of the present invention and the principles thereof, and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

In the drawings

FIG. 2 is a fragmentary, enlarged sectional view similar to FIG. 1;

FIG. 3 is an enlarged, fragmentary detail sectional view of a portion of the apparatus shown in FIG. 2;

FIG. 4 is a detail sectional view taken substantially along the line 4—4 in FIG. 2;

FIGS. 5–7 are diagrammatic longitudinal sectional views corresponding generally to the right end portion of FIG. 2 and showing various positions of the components of the tire building apparatus in forming a tire;

FIG. 8 is a diagrammatic sectional view ilustrating a stitching step in the forming of a tire;

FIGS. 9–12 are diagrammatic longitudinal sectional views corresponding generally to the right end of FIG. 2, and similar to FIGS. 5–7, but showing various additional positions of the components of the tire building apparatus in forming a tire;

FIG. 13 is a detail sectional view taken along the line 13—13 in FIG. 2;

DESCRIPTION OF THE EMBODIMENTS SHOWN HEREIN

Tire building apparatus 1, for building a complete tire and embodying the principles of the present invention, is shown in FIGS. 1-13 of the drawings to illustrate the presently preferred embodiment of the present invention.

The tire building apparatus 1 is of a type which may be embodied in any suitable tire building machine, such as, for example, a machine of the type shown in U.S. Pat. No. 4,007,081, issued Feb. 8, 1977 to Edwin E. Mallory.

Figure 1:
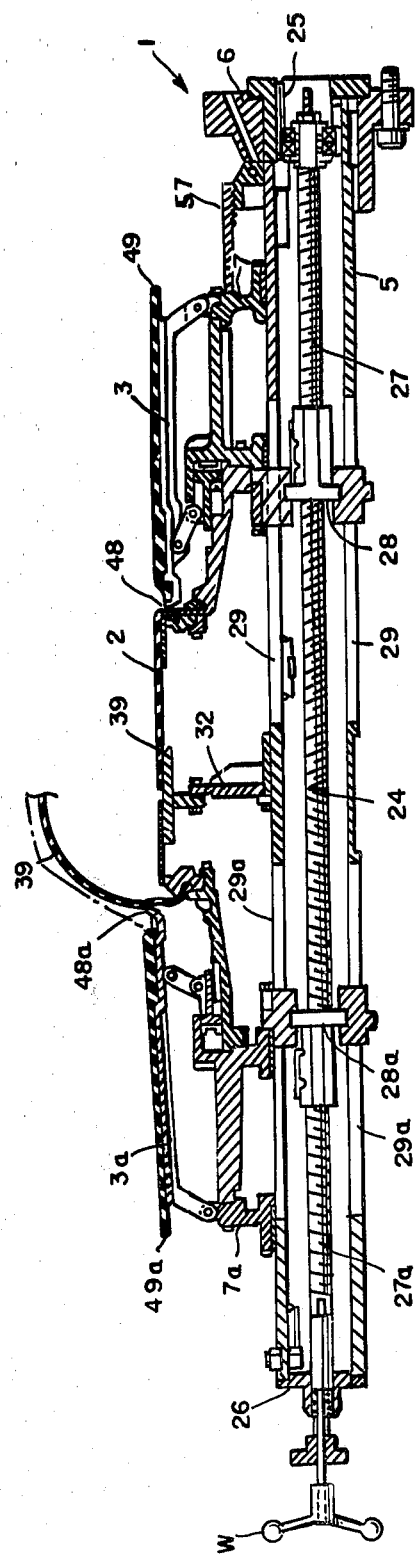
FIG. 1 is a longitudinal sectional view of a tire building apparatus, embodying the principles of the present invention, with the apparatus shown in collapsed position at the right side thereof and in expanded position at the left side thereof.

The tire building apparatus 1 embodies, in general, an intermediate drum assembly 2 and two end drum assemblies 3 and 3a disposed on opposite longitudinal sides of the intermediate drum assembly 2, the end drum assemblies 3 and 3a being disposed to the right and left, respectively, of the intermediate drum assembly 2, as viewed in FIGS. 1 and 2. The drum assemblies 2, 3 and 3a and the actuating apparatus therefor are symmetrical on opposite sides of the transverse center plane 4 of the tire building apparatus 1, and the parts therefor which are disposed to the left of the center plane 4, which are identical to parts shown to the right thereof, are indicated by the same reference numerals with the suffix "a" added thereto. Also, it is to be observed that in FIGS. 1 and 2, the portions of the drums 2 and 3 and the actuating mechanism therefor, which are disposed to the right of the center plane 4, are shown disposed in collapsed position, and the portions of the drums 2 and 3a and the actuating apparatus therefor, disposed to the left of the center plane 4, are shown in expanded position.

The tire building apparatus 1 includes a hollow, main shaft 5, which extends longitudinally therethrough. The shaft 5 extends axially through the drums 2, 3 and 3a, and the right end thereof is secured to a suitable mounting flange 6, which may be a portion of a tire building machine, not shown. The right end of the main shaft 5 may be mounted on any suitable supporting portion, not shown, of such a tire building machine.

A substantially cylindrical-shaped carrier unit 7 is mounted on the shaft 5 to the right of the center plane 4, in surrounding relation thereto. The carrier unit 7 embodies a housing 8 having a substantially cylindrical shaped side wall portion 9 disposed in outwardly spaced, surrounding relation to the main shaft 5. The sidewall 9 has an outer end portion 10, from the outer and inner ends of which radially inwardly project two annular flanges 11 and 12, respectively, FIG. 2. The flanges 11 and 12 are disposed on the main shaft 5 with a relatively snug, but freely slidable fit, for supporting the carrier unit 7 on the shaft 5. The sidewall 9 of the housing 8 also includes an inner end portion 13, which is secured by bolts 14 extending through the inner flange 12, and flares radially outwardly therefrom, as shown in FIG. 2.

The sidewall 9 has a radially outwardly projecting flange 15 on the inner end portion thereof, and a sleeve 16 projecting from the outer periphery of the flange 15 toward the center plane 4 in outwardly spaced, concentric relation to the outer end portion 17 of the inner end portion 13 of the sidewall 9, to define an annular cylinder 18 extending around the main shaft 4. An annular piston 19 is mounted in the cylinder 18 and is reciprocable therein axially of the main shaft 5, for a purpose which will be discussed in greater detail presently.

The piston 19 has an annular head portion 20 mounted in the cylinder 18 with a relatively snug, but freely slidable fit between the sleeve 16 and the outer end portion 17 of the front end portion 13 of the sidewall 9. The piston 19 also includes an annular sleeve or skirt portion 21 projecting from the head portion 20 toward the center plane 4 in concentric relation to the main shaft 5, FIG. 2. The inner end portion of the sleeve 21 is disposed in surrounding, sliding engagement with the outer face of an intermediate portion 22 of the front end portion 13 of the sidewall 9 in position to define another annular cylinder 23 between the sleeve 21 and the outer end portion 17 of the front end portion 13 of the sidewall 9, FIG. 2.

A carrier unit 7a, which is identical in construction to the carrier unit 7, is mounted to the left of the center plane 4, FIGS. 1 and 2, and it is to be remembered that the parts thereof which are identical to corresponding parts in the carrier unit 7 are indicated by the same reference numerals with the suffix "a" added thereto.

An inner shaft 24 extends longitudinally through the main shaft 5, in axial relation thereto, and is rotatably mounted in bearing assemblies 25 and 26 disposed in the right and left ends, respectively, of the main shaft 5, as viewed in FIG. 1. The inner shaft 24 has oppositely threaded end portions 27 and 27a disposed on opposite sides of the center plane 4, FIG. 2, and ball nuts 28 and 28a are mounted on the end portions 27 and 27a, respectively, in threaded engagement therewith. The balls nuts 28 and 28a are movable inwardly toward each other during rotation of the shaft 24 in one direction and outwardly away from each other during rotation of the shaft 24 in the other direction.

The main shaft 5 has two diametrically opposed slots 29 extending therethrough to the right of the center plane 4, and two diametrically opposed slots 29a extending therethrough to the left of the center plane 4, as viewed in FIG. 1. Each of the ball nuts 28 and 28a has two adapters 30 and 30a, respectively, projecting outwardly through respective ones of the slots 29 and 29a, respectively. The adapters 30 and 30a are secured to the flanges 12 and 12a of the carrier units 7 and 7a by bolts 31 and 31a, respectively, so that, upon movement of the ball nuts 28 and 28a inwardly and outwardly relative to each other longitudinally of the inner shaft 24, the carrier units 7 and 7a are correspondingly moved inwardly and outwardly toward and away from each other along the main shaft 5.

The intermediate drum assembly 2 embodies a central supporting member 32 disposed on the transverse center plane 4 of the tire building apparatus 1, FIG. 2. The central supporting member 32 embodies an annular base or mounting ring 33, FIGS. 2 and 4, mounted on and secured to the outer surface of the main shaft 5 between, and in spaced relation to the slots 29 and 29a through the latter. The supporting member 32 embodies a disk 34 projecting radially outwardly from the mounting ring 33, FIG. 3. The disk 34 embodies a body portion 35 projecting radially outwardly from the mounting ring 33, and a head portion 36 mounted on and secured to the outer end portion of the body portion 35 by a suitable respective fastening member, such as a bolt 37, FIG. 3. The radially outer surface 38 of the head portion 36 defines a circular supporting surface concentric to the shaft 5.

An elastic drum sleeve or diaphragm 39 is disposed around the outer peripheral surface of the central supporting member 32, and has oppositely disposed, enlarged annular end portions 40 and 40a mounted in end rings 41 and 41a, disposed on and secured to the inner ends of the inner end portions 13 and 13a of the sidewalls 9 and 9a of the carrier units 7 and 7a, respectively, FIG. 2, for a purpose which will be discussed in greater detail presently.

The end drum 3 embodies a plurality of elongated supporting arms or drum segments 42, equally spaced around the carrier unit 7. Each of the drum segments 42 embodies an elongated body portion 43, having an outer leg 44 and an inner leg 45 projecting inwardly toward the carrier unit 7 from respective opposite ends thereof. The free end portions of each of the legs 44 are pivotally secured to the outer end portions and of the carrier unit 7 by suitable means such as bolts 46, and each of the inner legs 45 of the drum segments 42 is pivotally connected by a respective link 47 to the annular piston 19. Preferably, the legs 44 and 45 and the links 47 are of such length that, when the end drum 3 is disposed in fully collapsed position, with the piston 19 disposed in the outwardly disposed position in the cylinder 18 shown in FIG. 2, the body portion 43 of each of the drum segments 42 is disposed in outwardly spaced, substantially parallel relation to the main shaft 5. Each of the body portions 43 of each of the drum segments 42 has an arcuate bead lock clamp member 48, of a conventional type, disposed at the inner end thereof.

Supported on the outer periphery of the end drum 3 is an inflatable ply turn-up bag 49, FIGS. 2, 5-7 and 9-12. The bag 49 may be of any suitable type, such as, for example, the type shown in U.S. Pat. No. 3,833,445, issued to Edwin E. Mallory, but preferably is of a dual compartment or two-bag configuration, embodying an outer low pressure bag 50 and an inner high pressure bag 51, FIGS. 5 and 10. The low pressure bag 50 embodies an inner layer of rubber 52 and an outer layer of rubber 53, FIG. 5, which, if desired, may also be axially reinforced by steel wires or other material of high tensional strength. At the inner end of the bag 50, the inner layer 52 is formed with a truncated portion 54, having a snug fit with correspondingly formed grooves in the bead lock clamp members 48 on the inner ends of the drum segments 42. The truncated portions 54 are ported in any suitable manner for admitting fluid under pressure into the bag 50 to effect inflation thereof, and also for release of fluid under pressure for deflation of the bag 50.

The high pressure bag 51 also embodies two layers of rubber 55 and 56 disposed axially outwardly of the truncated portion 54 and lying inwardly within the bag 50, FIGS. 5 and 10. Any suitable ports, now shown, may be provided for admitting fluid under pressure into the high pressure bag 51 and releasing pressure therefrom in the operation of the tire forming apparatus 1, as will be discussed in greater detail presently.

An end drum 3a and an inflatable ply turn-up bag 49a, which are identical in construction to the end drum 3 and the turn-up bag 49, respectively, are mounted on the carrier unit 7a, to the left of the center plane 4, as viewed in FIG. 2, and parts thereof, which are identical to corresponding parts of the end drum 3 and the bag 49, respectively, are indicated in the drawings by the same reference numerals as the aforementioned corresponding parts, with the suffix "a" added thereto.

It will be remembered that, during rotation of the inner shaft 24 relative to the main shaft 5, during operation of the tire forming apparatus 1, the carrier units 7 and 7a, and, therefore, the end drums 3 and 3a are caused to move inwardly and outwardly relative to each other axially of the main shaft 5. The extent of such inward movement on the carrier units 7 and 7a and the end drums 3 and 3a may be controlled by any suitable means such as, for example, suitable limit switches connected to a drive motor, not shown, for rotating the shaft 24. However, for limiting the outward movement of the carrier units 7 and 7a and the end drums 3 and 3a, and thereby setting the position of the bead disposed in the tire to be formed in the apparatus 1, as will be discussed in greater detail presently, I prefer to use an adjustment nut or sleeve 57, mounted on and threadedly engaged with an inner end portion 58 of the mounting flange 6. The adjustment nut 57 projects axially inwardly from the mounting flange 6 and is disposed in position around the main shaft 5 wherein the inner end of the nut 57 will abuttingly engage the outer flange 11 of the carrier unit 7, when the carrier untis 7 and 7a and the end drums 3 and 3a have moved to their desired outermost positions on the inner shaft 24. By rotating the nut 57 on the end portion 58 of the mounting flange 6, this outermost position of the carrier units 7 and 7a and the end drums 3 and 3a may be readily and accurately adjusted.

Adjustment of the carrier units 7 and 7a to their normal, initial, at-rest position, prior to the initiation of a tire-building operation of the apparatus 1, may be manually accomplished by attaching a hand wheel assembly W to the shaft 24 and turning the hand wheel W, FIG. 1, with the shaft 24 disconnected from its drive means, to thereby dispose the carrier unit 7 in the aforementioned abutting engagement with the inner end of the adjustment nut 57.

In the operation of the tire building apparatus 1, the intermediate drum 2 and the end drums 3 and 3a are initially disposed in fully collapsed position, with the end drums 3 and 3a disposed in full outermost position on the main shaft 5, wherein the flange 11 of the carrier unit 7 is disposed in abutting engagement with the bead set adjustment nut 57, as illustrated by that part of the apparatus 1 disposed to the right of the center plane 4 in FIG. 2. In this position of the tire building apparatus 1, the pistons 19 and 19a are disposed in their full outermost positions in the cylinders 18 and 18a, respectively, as illustrated by the piston 19 in FIG. 2, to thereby, preferably, dispose the outer surfaces of the bags 49 and 49a on the end drums 3 and 3a and the outer surface of the sleeve 39 on the intermediate drum 2 in axial alignment with each other. With the parts of the apparatus 1 disposed in such position, in a conventional manner and as shown in FIG. 5, carcass and sidewall material 59 may be applied over the elastic drum sleeve 39 and the ply turn-up bags 49 and 49a, and tire beads 60 may be positioned radially outwardly of the bead lock clamp members 48 and 48a and held in such position by bead holders, not shown.

Figures 7, 8, 9:
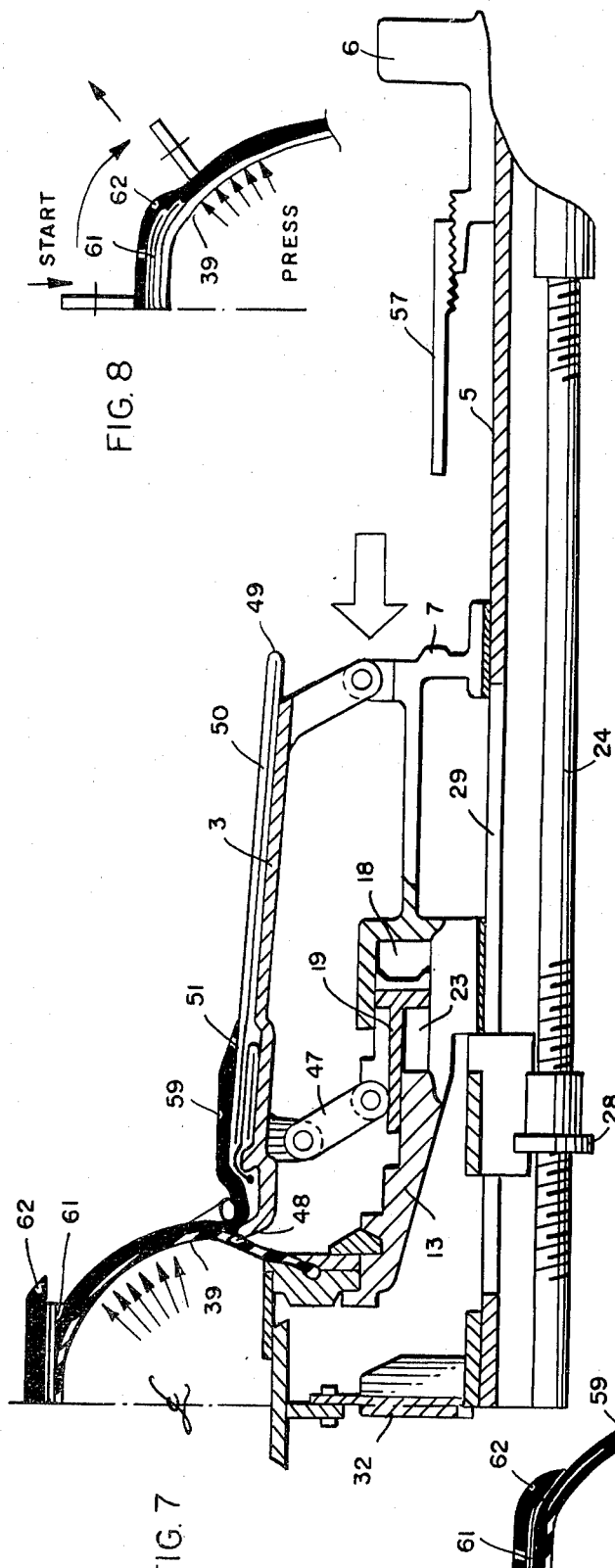

Air under pressure may then be introduced into the cylinders 18 and 18a in the carrier units 7 and 7a, respectively, by conventional porting, not shown, to thereby move the pistons 19 and 19a axially inwardly, the cylinders 23 and 23a, at this time, being open to atmosphere. As shown in FIG. 6, the inward movement of the pistons 19 and 19a is effective, through the links 47, to move the bead lock clamp members 48 and 48a on the inner end portions of the end drum segments 42 and 42a, respectively, radially outwardly to engage or lock, accurately and concentrically, the tire material 59 with the tire beads 60. Thereafter, the inner shaft 24 may be rotated by suitable drive means, such as, for example, a motor, now shown, in the proper direction to cause the ball nuts 28 and 28a to move axially inwardly toward each other and thereby move the carrier units 7 and 7a, respectively, inwardly therewith; and simultaneously with the inward movements of the carrier units 7 and 7a, air under pressure may be fed into the interior of the intermediate drum assembly 2, between the carrier units 7 and 7a. This simultaneous inward movement of the carrier units 7 and 7a and application of air pressure to the interior of the intermediate drum assembly 2 causes the bead lock clamp members 48 and 48a and the locked beads 60 and 60a to move axially inwardly with the carrier units 7 and 7a, and causes the drum sleeve 39 of the intermediate drum assembly 2 to be bulged outwardly into a toroidal shape, as shown in FIG. 7. At this stage of the operation, the expansion of the drum sleeve 39 has placed the tire carcass material 59 under tension and partially preformed the same; and the axial inward movement of the bead lock clamp members 48 and 48a, with the carrier units 7 and 7a, respectively, has moved the locked beads 60 and 60a into positions directly radially inwardly of the shoulders of the tire under construction. When the carrier units 7 and 7a have moved into these last mentioned, innermost positions on the shaft 24, further inward movement of the carrier units 7 and 7a is stopped by suitable means, such as, for example, a limit switch on the drive motor for the shaft 24, not shown.

Thereafter, in a conventional manner, breaker and tread cap components 61 and 62, FIG. 7, may be applied and secured or stitched to the partially preformed tire carcass, as shown in FIG. 8. Breaker and tread cap components, if preferred, may be pre-constructed on a suitable building drum and be pre-positioned radially about the center line 4 of the tire. They would be supported there by a transfer means, not shown. In this instance, the tire carcass would be expanded directly into the belt and tread cap by the aforementioned expansion means. The belt transfer and support means is then removed, and tread cap stitching is completed, as shown in FIG. 8. The sidewall portions of the tire material 59 may be turned up and applied to the carcass by inflation of the ply turn-up bag 49 and axial inward movement of pusher rings 63, FIGS. 9-10, and the sidewall material may then be stitched, FIG. 11.

In the actuation of the turn-up bags 49 and 49a, the high pressure bags 51 and 51a are first inflated, FIG. 9, to encase the tire beads 60 and 60a in opposite end portions of the tire carcass material, and the low pressure bags 50 and 50a are then inflated and the pusher rings 63 are moved inwardly to apply the sidewall components and the outer end portions of the carcass material to the sidewalls of the shaped carcass material.

Thereafter, air under pressure may be introduced into the cylinders 23 and 23a in the carrier units 7 and 7a, and, with the cylinders 18 and 18a being vented to atmosphere, the pistons 19 and 19a are moved axially outwardly to thereby move the bead lock clamp members 48 radially inwardly out of engagement with the beads of the formed tire; and the shaft 24 may be rotated in a reverse direction by its aforementioned driving means, not shown, to thereby move the carrier units 7 and 7a back out into their outermost position, as shown in FIG. 12, wherein the carrier unit 7 is again abuttingly engaged with the adjustment nut 57.

The formed tire carcass may then be removed from the tire building apparatus 1 by axially moving the same outwardly over an end thereof. Thereafter, of course, the tire may be cured in a conventional curing mold to form a completed tire.

I have found that in building a tire on the apparatus 1, while it is desirable that the air pressure in the intermediate portion of the sleeve 39 be sufficient to prevent distortion thereof during ply turn-up and sidewall-application operations, it should not be so great as to cause excessive outward pressure on the intermediate portion of the sleeve 39 sufficient to cause slippage of the carcass material relative to the beads 60 and the bead lock clamp members 48. The latter is particularly true with respect to the building of truck tires, which, normally, are broader and the expansion of which causes greater tension on the sidewalls thereof than is true with respect to smaller tires, such as, for example, automobile tires.

Also, I have found that with the apparatus 1 constructed in the aforementioned manner, the air pressure in the high pressure bags 51 and 51a, during a ply turn-up operation, may be, and preferably is greater than the air pressure in the intermediate portion of the sleeve 39. Of course, as has been true with respect to two-compartment turn-up bags heretofore known in the art, the pressure in the high pressure bags 51 and 51a is preferably higher than the pressure in the low pressure bags 50 and 50a.

In this connection, I have found that in the building of truck tires on an apparatus, such as that apparatus 1, the air pressure in the intermediate portion of the sleeve 39, during a ply turn-up operation, should not be substantially less than 12 pounds per square inch and not substantially more than 25 pounds per square inch, and, preferably, is in the nature of 15 pounds per square inch; and in the building of an automobile tire, the pressure in the intermediate portion of the sleeve 39 should not be substantially less than 15 pounds per square inch and not substantially more than 30 pounds per square inch, and, preferably, is in the nature of 22 pounds per square inch. Also, I have found that in such operation of the apparatus 1, the air pressure in the high pressure bags 51 and 51a preferably is not substantially less than one and one-half times and not substantially more than twice the air pressure in the intermediate portion of the sleeve 39, and is not substantially less than one and one-half times and not substantially more than five times the air pressure in the outer bags 50 and 50a, and that to maintain this relationship, the pressure in the high pressure bags 51 and 51a should not be substantially less than 25 pounds and not substantially more than 35 pounds, and preferably, is in the nature of 30 pounds per square inch, and that the pressure in the low pressure bags 50 and 50a should not be substantially less than 6 pounds per square inch and not substantially more than 16 pounds per square inch, and, preferably, is in the nature of 10 pounds per square inch.

In the preferred form of the present invenion, the inner legs 45 of the drum segments 42, FIG. 2, are secured to the respective links 47 by bolts 65, so that the drum segments 42 are releasably secured to the carrier unit 7 by bolts 46 and 65, and may be quickly and easily removed and replaced, as will be discussed in greater detail presently.

In addition, in the preferred form of the invention shown in the drawings, the end portions 40 and 40a of the sleeve 39 are held in the end rings 41 and 41a, respectively, FIG. 2, by outer rings 66 and 66a, respectively, disposed outwardly of the latter. The end rings 41 and 41a are secured to the inner ends of the inner portions 13 of the housing 8 of the carrier unit 7 by suitable means such as bolts 67 and 67a, respectively, and the rings 66 and 66a are releasably held against the outer faces of the end rings 41 and 41a by split clamping rings 68 and 68a mounted in annular grooves in the aforementioned end portions 13 and 13a of the carrier units 7 and 7a, FIG. 2, and releasably held in clamping engagement with the respective adjacent rings 66 and 66a by suitable means such as bolts or pins 69 and 69a, as shown in FIG. 2.

It will be remembered that, in the presently preferred embodiment of the present invention, the central supporting member 32 of the intermediate drum assembly 2, FIGS. 2 and 3, embodies a disk 34 projecting radially outwardly from a mounting ring 33, with the disk 34 embodying a head portion 36 releasably secured to the outer end of a body portion 35 by bolts 37. With this construction, if it is desired to change the size of the supporting member 32 in the apparatus 1, this may be readily accomplished by removing the bolts 37 and moving the head portion 36 axially outwardly over the outer drum 3a, from which the drum segments 42 have been previously removed. A new head portion 36 of the proper size for the tire which is to be built may be moved axially inwardly over the outer drum 3a and secured to the body portion 34 of the supporting member 32 by bolts 37.

With this construction, the apparatus 1 may be readily changed to build different size tires. Thus, if such a change is desired, the bolts 46 and 46a may be removed and the end drum segments 42 and 42a may be swung outwardly around the bolts 65 and 65a, respectively, to afford access to the latter. The bolts 65 and 65a may then be removed and the drum segments 42 and 42a removed from the apparatus 1.

The fastening members 69 and 69a on the clamping rings 68 and 68a, respectively, then may be released to thereby free the sleeve 39 for removal from the end rings 41 and 41a, to thus uncover the central portion of the apparatus 1. With the sleeve 39 removed, the supporting member 32 is accessible from outside the apparatus 1 so that the head portion 36 of the supporting member 32 may be removed, by first remving the bolts 37. Also, the bolts 67 and 67a may be removed from the end rings 41 and 41a, and the end rings 41 and 41a may then be removed from the inner end portions 13 and 13a of the carrier units 7 and 7a, respectively.

Thereafter, the apparatus 1 may again be reassembled, replacing the removed parts with parts which are larger or smaller than the removed parts, depending upon whether the tire to be built on the apparatus is to be larger or smaller in size, respectively. Thus, for example, if the apparatus 1 is to be reassembled to accommodate a larger size tire, a larger head portion 36 may be secured to the body portion 35 of the supporting member 32 by the bolts 37.

Also, new end rings, having outside diameters that are as much greater than the outside diameters of the end rings 41 and 41a as the increased outside diameter of the supporting member, replacing the supporting member 32, may be mounted on the inner end portions 13 and 13a of the carrier units 7 and 7a and secured thereto by the bolts 67 and 67a, respectively. The position of the carrier units 7 and 7a may then be adjusted to the proper new position to accommodate the new sleeve, to be substituted for the sleeve 39, by rotating the shaft 24 and the adjustment nut 57.

Thereafter, the new sleeve 39, of correspondingly greater diameter, may be mounted in operative position around the new supporting member 32 and engaged in the new end rings 41 and 41a. New clamping rings 66 and 66a may then be disposed in position outwardly of the new end rings 41 and 41a, and secured in operative position thereon by reinstalling the clamping rings 68 and 68a and securing the latter in position with the fastening members 69 and 69a, respectively.

Thereafter, new drum segments 42 and 42a, having legs 44 and 45 and 44a and 45a, respectively, of the proper length may be secured to the links 47 and 47a by the bolts 65 and 65a, and then secured to the carrier units 7 and 7a by the bolts 46 and 46a. This completes the reassembling of the apparatus 1.

Thus, it will be seen that the apparatus 1 may be relatively readily and quickly changed to accommodate tires of different sizes, and that this may be accomplished with relatively little over-haul of the apparatus 1 and with relatively little shut-down time thereof.

A tire building apparatus 101 is shown in FIGS. 14-17 of the drawings to illustrate a modified form of the present invention, and parts of the apparatus 101, which are identical in construction to corresponding parts of the apparatus 1 shown in FIGS. 1-13, are indicated by the same reference numeals, and parts which are similar to parts that are shown in FIGS. 1-13, but have been substituted therefor are shown by the same reference numerals but increased by 100.

The apparatus 101 is identical in construction to the apparatus 1 shown in FIGS. 1-13, except (1) no ply turn-up bag, corresponding to the bags 49 and 49a of the apparatus 1, is embodied therein; (2) locating stops, such as the stops 70, FIGS. 14-17, are embodied on the inner end portions of certain drum segments 142 of the end drum 103; and (3) the apparatus 101 embodies a central supporting member 71 for the drum sleeve 39, the supporting member 71 embodying two telescoping cylinders 72 and 72a mounted on the end rings 41 and 41a, which are disposed on the inner ends of the inner end portions 13 and 13a of the side walls 9 and 9a of the carrier units 7 and 7a, respectively, FIG. 14.

The end drum 103, shown in FIGS. 14-17, is identical in construction to the end drum 3, shown in FIGS. 1-13, except that the end drum 103 embodies at least three, or more, of the drum segments 142, equally spaced therearound. The drum segments 142 are identical in construction to the drum segments 42, shown in FIGS. 1-13, except that a locking stop, such as the locking stop 70, FIGS. 14-17, is secured to the inner end portion of each respective drum segment 142 by suitable means, such as, for example, welding. Each of the locking stops 70 is substantially L-shaped in transverse cross section, embodying a lower, substantially horizontally extending leg 73 mounted on and secured to the outer face of the respective drum segment 142 in parallel relation thereto, and an outwardly projecting inner leg 74 disposed substantially perpendicular to the leg 73 in uniplanar relation to the outer edge of the arcuate bead lock clamp member 48 on the respective drum segment 142, FIG. 15.

Figure 14:
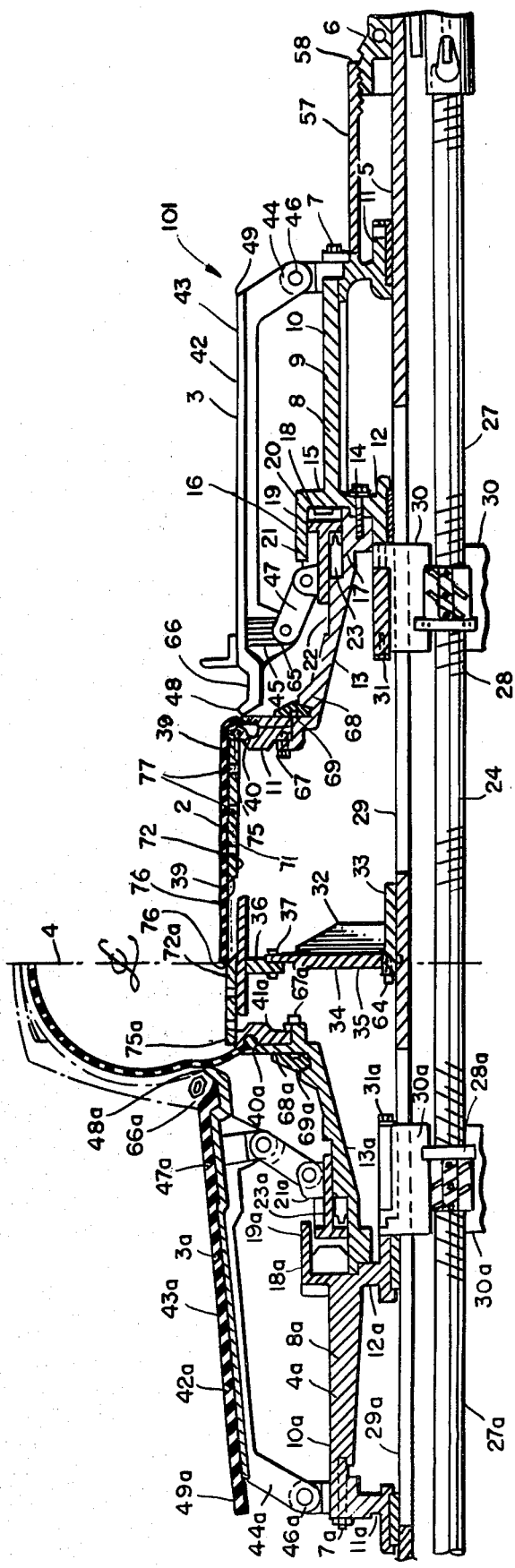
FIG. 14 is a view similar to FIG. 2, but showing a modified form of the present invention.
Figure 15:
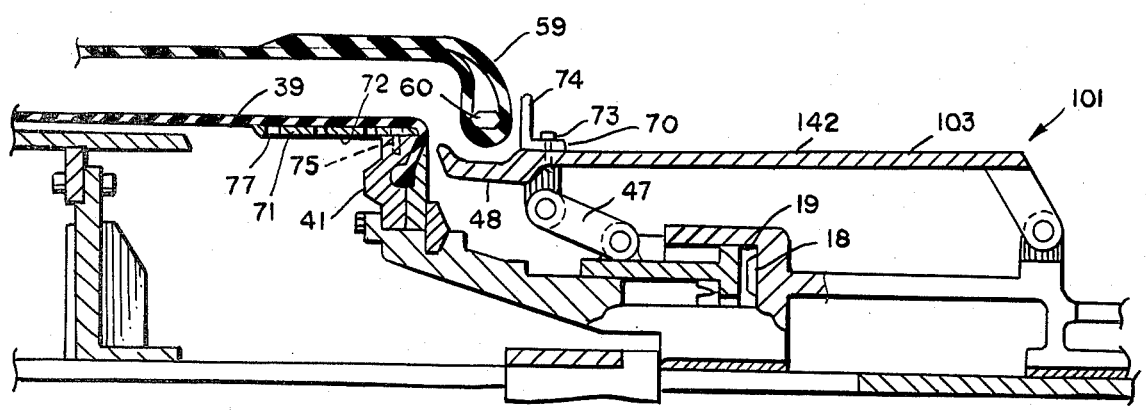
FIGS. 15-17 are diagrammatic longitudinal sectional views corresponding generally to the right end portion of FIG. 2 and similar to FIGS. 5-7, but showing the modified form of the present invention shown in FIG. 14.
Figure 16:
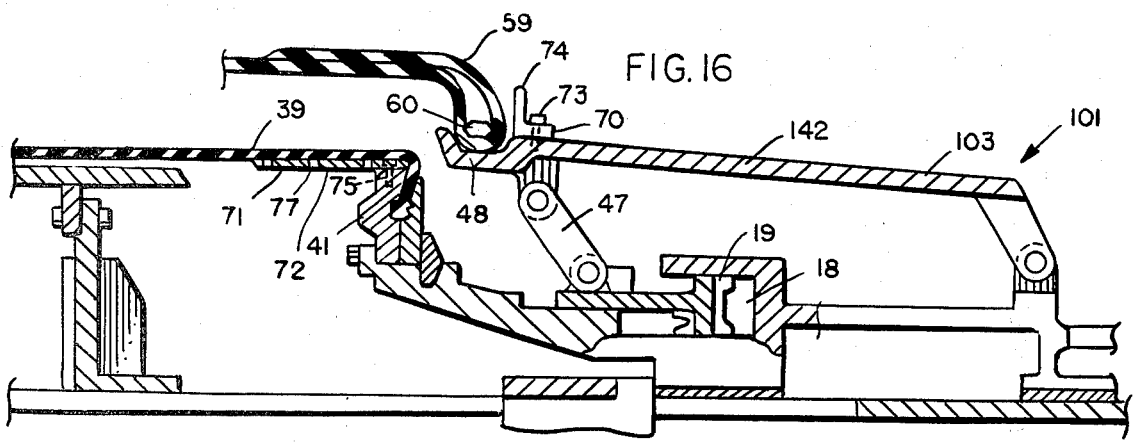
Figure 17:
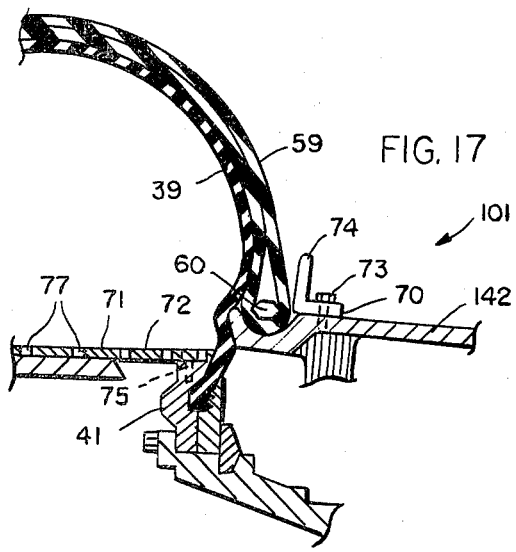

The cylinders 72 and 72a are disposed on the end rings 41 and 41a, respectively, in surrounding relation thereto, and are secured to the end rings 41 and 41a by suitable means such as bolts or screws 75 and 75a, respectively, FIG. 14. The cylinders 72 and 72a may be disposed in telescoping relation to each other, with the cylinder 72a disposed within the cylinder 72. The lengths of the cylinders 72 and 72a are such that, when the apparatus 101 is disposed in unactuated position, as illustrated in the right portion of FIG. 14, the inner ends of the cylinders 72 and 72a are disposed around the adjacent edge portions of the head portion 36 of the supporting member 32, as illustrated by the inner edge 76 of the cylinder 72 shown in solid lines in FIG. 14, and when the apparatus 101 is in fully actuated position, as illustrated by the left side of FIG. 14, the inner edges of the cylinders 72 and 72a are disposed on the other side of the head portion 36 of the central supporting member 32, but spaced inwardly from the retaining rings 41a and 41, respectively, as illustrated by the edge portion 76 of the cylinder 72, shown in broken lines in FIG. 14.

The cylinders 72 and 72a have openings 77 and 77a extending therethrough, respectively, for the passage of air radially outwardly through the cylinders 72 and 72a, for pneumatically forcing the sleeve 39 outwardly therefrom, as will be discussed in greater detail presently.

From the foregoing, it will be seen that the apparatus 1 may be quickly and easily converted to the apparatus 101, and vice versa. Thus, for example, to convert the apparatus 1 into the apparatus 101, it is merely necessary to remove those drum segments 42 from the apparatus 1 that are to be replaced by the drum segments 142 of the apparatus 101, and substitute the drum segments 142 therefor; remove the air bags 49 and 49a from the apparatus 1; and mount the cylinders 72 and 72a in operative position on the end rings 41 and 41a, respectively, of the apparatus 101, in supporting relation to the diaphragm 39.

When the apparatus 101 is constructed or set up in the manner shown in FIGS. 14–17, it is intended for use as a "second stage" machine for completing the building of a tire from a tire carcass that has been pre-formed on another "first stage" machine. In this use of the apparatus 101, the pre-formed tire carcass embodies the beads, such as the bead 60, shown in FIGS. 14–17, and the sidewall material, such as the material 59 shown in FIGS. 14–17, of the tire carcass shown in FIGS. 1–13, before the carcass is moved onto the apparatus 101. In moving the tire carcass onto the apparatus 101, it is disposed around the left end of the apparatus 101 and moved to the right, as viewed in FIGS. 14–17 until the bead 60 engages the inner faces of the legs 74 of the locating stops 70. This positioning of the tire carcass properly positions the bead 60, and the corresponding bead on the other side of the carcass, in position wherein, they may be properly clampingly engaged by the respective lock clamp members 48 and 48a disposed at respective opposite sides of the transverse center plane of the apparatus 101, during operation of the apparatus 101, as illustrated by the bead lock clamp member 48 in FIG. 16.

After the carcass is thus disposed in proper position around the apparatus 101, the operation of the apparatus 101 is substantially identical to that portion of the operation of the apparatus 1, illustrated by FIGS. 5–7, inclusive. That is, referring to FIGS. 15–17, which show only the right end of the apparatus 101, but remembering that the left end of the apparatus 101, not shown, is identical thereto, except that it is a mirror image thereof, and operates in the same manner, piston 19 is moved outwardly in the cylinder 18 from the position shown in FIG. 15 to the position shown in FIG. 16 (which are similar to FIGS. 5 and 6) to thereby move the bead lock clamp members 48 outwardly into locking position with the bead 60. Thereafter, air is fed, under pressure, outwardly through the cylinders 72 and 72a to thereby bulge the sleeve 39 and the carcass material 59 outwardly into the substantially toroidal shape shown in FIG. 17, and the breaker belt 61 and tire cap 62 may then be applied to the carcass material 59 and stitched thereto, as hereinbefore described with respect to the operation of the apparatus 1, shown in FIGS. 1–13, and as illustrated in FIG. 11.

Thereafter, the apparatus 101 may be moved back to its initial operating position and the formed tire carcass may be removed therefrom, over the left end of the apparatus 101, in the same manner as heretobefore described with respect to the apparatus 1.

As will be appreciated by those skilled in the art, although the cylinders 72 and 72a are shown herein as telescoping cylinders having openings 77 therethrough and mounted around a central supporting member 32, this is merely by way of illustration of the preferred form of constructing the apparatus 101, and not by way of limitation and changes in the construction of the supporting structure for the sleeve 39 and the tire carcass material 59 afforded thereby may be made without departing from the purview of the broader aspects of the present invention.

From the foregoing it will be seen that the present invention affords a novel tire building apparatus.

Also, it will be seen that the present invention affords a novel tire building apparatus wherein the carcass-forming operation is pneumatically effected in a novel and expeditious manner.

In addition, it will be seen that the present invention affords a novel tire building apparatus which may be quickly and easily changed to build different size tires.

Also, it will be seen that the present invention affords a novel tire building apparatus that can be quickly and easily converted from an apparatus for building a complete tire to an apparatus for use as a "second stage" machine, and vice versa.

Also, it will be seen that the present invention affords a novel tire building apparatus which is practical and efficient in operation and which may be readily and economically produced commercially.

Thus, while I have illustrated and described the preferred embodiments of my invention, it is to be understood that they are capable of variation and modification, and I, therefore, do not wish to be limited to the precise details set forth, but desire to avail myself of such changes and alterations as fall within the purview of the following claims.

I claim:

1. A tire building apparatus for building a complete tire in a single operation, including in combination:
an elongated shaft,
an intermediate drum mounted on said shaft in surrounding relation thereto, said intermediate drum including a central supporting member and an elastic sleeve having an intermediate portion and two oppositely disposed end portions, with said elastic sleeve operable between a collapsed position, wherein said intermediate portion and said end portions are axially aligned with each other in position to form a substantially smooth walled cylindrical member, and an expanded position, wherein said end portions are disposed closer together than in said collapsed position and said intermediate portion is disposed radially outwardly of said collapsed position thereof, two end drums disposed around said shaft on respective opposite sides of said intermediate drum, said end drums having outer peripheral surfaces extending axially, in the unactuated condition for use, in conjunction, with said central supporting member for complete support of the tire carcass components thereon and bead lock clamp means movable radially outwardly to clamp the tire carcass material to the tire beads, wherein in one position said outer peripheral surfaces are disposed in substantially axially aligned relation to the collapsed position of the outer peripheral surface of said intermediate drum sleeve to support the tire carcass material therearound, carrier means mounted on said shaft and movable axially relative thereto and operatively connected to said end portions of said intermediate drum sleeve and said end drums, said carrier means being movable relative to said shaft for simultaneously moving said end portions of said intermediate drum sleeve inwardly toward each other along said shaft into said expanded position thereof and said end drums inwardly toward each other along said shaft into position to dispose said bead lock clamp means in position to support the beads in the position of the beads of a finished tire, means for feeding air under pressure into said sleeve, simultaneously with said moving of said end portions inwardly toward each other, to thereby move said intermediate portion of said sleeve radially outwardly into said expanded position thereof and thereby correspondingly move the carcass material disposed thereon outwardly into said expanded position, and carcass ply turn-up means mounted on said end drums axially outwardly of said bead lock clamping means.

2. A tire building apparatus in accordance with claim 1 wherein said intermediate drum and said central supporting member mounted on said shaft in surrounding relation thereto radially support said intermediate portion of said sleeve when said sleeve is disposed in said collapsed position.

3. A tire building apparatus in accordance with claim 1 wherein said ply turn-up means includes inflatable bags mounted on and extending around said end drums, said inflatable bags being movable between a collapsed position wherein said bags define substantially smooth walled cylindrical members extending around respective ones of said end drums and an inflated position wherein said bags project radially outwardly from said respective drums in position to press the portion of the carcass material placed on said end drums axially outwardly of said bead lock clamp means into engagement with the portion of the carcass material disposed on said sleeve, when said intermediate portion thereof is disposed in said expanded position, with the apparatus further including means for feeding air under pressure into said bags for moving the latter from said collapsed position to said inflated position.

4. A tire building apparatus in accordance with claim 3 wherein each of said bags comprises an inner, annular, tubular bag and an outer, annular, tubular bag with said outer bags having larger outside diameters than said inner bags, and wherein each of said inner bags is mounted in a respective one of said outer bags in immediately adjacent relation to the inner peripheral surface of the latter and on a respective one of said end drums in immediately adjacent relation to bead lock clamp means of the latter in such position that when said inner bag is in said inflated position, said inner bag is in position to press that portion of such carcass material disposed immediately outwardly of said bead lock clamp means on said end drum around the bead clamped thereby and into engagement with said carcass material disposed on said end portions of said sleeve immediately inwardly of said bead lock clamp means, each of said outer bags is mounted on a respective one of said end drums in such position that when said outer bag is in said inflated position, said outer bag is in position to press that portion of said carcass material disposed outwardly of said inner bag therein into engagement with said carcass material disposed on said intermediate portion of said sleeve.

5. A tire building apparatus in accordance with claim 4 wherein said means for feeding air into said bags comprises means for feeding air into said inner bags at a higher pressure than into said outer bags.

6. A tire building apparatus in accordance with claim 4 wherein said means for feeding air into said bags comprises means for feeding air into said inner bags at a higher pressure than that of the air fed into said sleeve by said means for feeding air into said sleeve.

7. A tire building apparatus in accordance with claim 4 wherein said means for feeding air into said bags comprises means for feeding air into said inner bags at a pressure higher than into said outer bags and at a pressure higher than that of the air fed into said sleeve by said means for feeding air into said sleeve.

8. A tire building apparatus in accordance with claim 7 wherein said air pressure in said intermediate poriton of said sleeve is not substantially less than 12 pounds per square inch and not substantially more than 25 pounds per square inch when a truck tire is being made, and is not substantially less than 15 pounds per square inch and not substantially more than 30 pounds per square inch when an automobile tire is being made, and wherein said air pressure in said inner bags is not substantially less than 25 pounds per square inch, and wherein said air pressure in said outer bags is not substantially less than 6 pounds per square inch and not substantially more than 16 pounds per square inch.

9. A tire building apparatus in accordance with claim 7 wherein said air pressure in said inner bags is not substantially less than one and one-half times and not substantially more than twice the air pressure in said intermediate portion of said sleeve and is not substantially less than one and one-half times and not substantially more than five times the air pressure in said outer bags.

10. A tire building apparatus in accordance with claim 2 wherein said carrier means include two removably mounted portions disposed on opposite sides of said annular supporting means and releasably connected to respective ones of said end portions of said sleeve to thereby enable said sleeve to be removed therefrom, said drums are removably mounted on said carrier means and said annular supporting means is removably mounted on said shaft.

11. A tire building apparatus in accordance with claim 10 wherein the size of the tire built thereon may be changed by changing said removably mounted portions on said carrier means, said sleeve, said end drums and said annular supporting means.

12. A tire building apparatus, including in combination:
an elongated shaft,
an intermediate supporting means mounted on said shaft in surrounding relation thereto, said intermediate supporting means including a central supporting member and an elastic sleeve having end portions thereon disposed around said shaft,
two end supporting means disposed around said shaft on respective opposite sides of said intermediate supporting means, said end supporting means having outer peripheral surfaces extending axially in the unactuated condition for use, in conjunction with said central supporting member for complete support of the tire carcass components thereon and bead lock clamp means movable radially outwardly to clamp the tire carcass material to the tire beads, wherein in one position said outer peripheral surfaces are disposed in substantially axially aligned relation to the collapsed position of the outer peripheral surface of said intermediate supporting means to support the tire carcass mateiral therearound,
carrier means mounted on said shaft and movable axially relative thereto and operatively connected to said end supporting means and to said end portions of said sleeve on said intermediate supporting means, said carrier means being movable relative to said shaft for moving said end portions of said sleeve inwardly towards each other and for moving said end supporting means inwardly toward each other along said shaft to dispose said bead lock clamp means in position to support the beads in the position of the beads of a finished tire, and
means for feeding air under pressure into said intermediate supporting means, simultaneously with said moving of said end supporting means inwardly toward each other, for expanding of said elastic sleeve radially outwardly into an expanded position thereof and thereby correspondingly move the carcass material disposed thereon outwardly into said expanded position.

13. A tire building apparatus in accordance with claim 12 wherein said tire carcass material includes preformed tire carcass material including two beads and carcass ply and sidewall material projecting from each of said beads toward the other of said beads.

14. A tire building apparatus in accordance with claim 12 further including abutment members mounted on one of said end supporting means at the side of said bead clamp means thereof remote from the other of said end supporting means, and projecting substantially radially outwardly from said one end supporting means in position to engage an edge of said carcass material.

15. A tire building apparatus in accordance with claim 12 wherein said outer peripheral surfaces of said end supporting means are airpervious and mounted on said carrier means for movement therewith toward and away from each other axially of said shaft, and disposed within said elastic sleeve in position to support the latter.

16. A tire building apparatus as defined in claim 15 where said said outer peripheral surfaces of said end supporting means comprise cylindrical members mounted on respective ones of said carrier means and disposed in telescoping relation to each other.

* * * * *